United States Patent
Christ et al.

(10) Patent No.: US 9,905,111 B1
(45) Date of Patent: Feb. 27, 2018

(54) ALERT-CAPABLE REFUSE SYSTEM

(71) Applicants: Thomas Luke Christ, Blue Bell, PA (US); Paul Francis Christ, Blue Bell, PA (US)

(72) Inventors: Thomas Luke Christ, Blue Bell, PA (US); Paul Francis Christ, Blue Bell, PA (US)

(*) Notice: Subject to any disclaimer, the term of this patent is extended or adjusted under 35 U.S.C. 154(b) by 28 days.

(21) Appl. No.: 14/999,690

(22) Filed: Jun. 16, 2016

(51) Int. Cl.
| G08B 21/00 | (2006.01) |
| G08B 21/18 | (2006.01) |
| G01G 19/52 | (2006.01) |
| G08B 3/10 | (2006.01) |
| G08B 5/22 | (2006.01) |

(52) U.S. Cl.
CPC .......... *G08B 21/182* (2013.01); *G01G 19/52* (2013.01); *G08B 3/10* (2013.01); *G08B 5/22* (2013.01)

(58) Field of Classification Search
CPC ........ G08B 21/182; G08B 5/36; G01G 15/00; B66F 17/00
USPC ........................................... 340/666
See application file for complete search history.

(56) References Cited

U.S. PATENT DOCUMENTS

| 4,860,267 | A * | 8/1989 | Herrington | B65F 1/14 220/908 |
| 5,235,325 | A * | 8/1993 | McCaughan, Jr. | G08B 13/08 200/85 R |
| 2011/0238598 | A1* | 9/2011 | Borowski | G06Q 99/00 705/500 |
| 2014/0060942 | A1* | 3/2014 | Qu | G01G 19/083 177/136 |
| 2014/0318876 | A1* | 10/2014 | Kellams | G01G 23/005 177/45 |
| 2016/0356640 | A1* | 12/2016 | Freeman | G01G 19/52 |

* cited by examiner

*Primary Examiner* — Mark Rushing

(57) ABSTRACT

A system for alerting a user when the contents of a refuse container have reached or exceeded a specific weight level. The system measures the weight of the contents and will have the potential to send an alert in a plurality of ways selected by the user or selected by someone associated with the user.

18 Claims, 2 Drawing Sheets

ALERT-CAPABLE REFUSE SYSTEM

BACKGROUND

The invention generally relates to the field of refuse management, and more particularly, to a system for alerting users that accumulated refuse has reached or exceeded a certain weight limit.

For many people, carrying heavy items can create health issues. These issues can range from small aches and pains to major issues that require medical care. For instance, carrying heavy items can lead to muscle and ligament strain or, in more serious cases, major problems that can only be treated surgically. While injury from carrying heavy items can affect all age groups, older people are particularly susceptible to injury when they lift something that is considered heavy.

Unfortunately, there are many situations in which people are not aware of how heavy an item is that they are about to lift. It is possible that knowing this in advance could either indicate they should not lift the item, at least not alone, or, if possible, they should consider reducing the weight of the item before attempting to lift it.

One item that is often lifted several times during a week is trash that is to be disposed. Lifting trash can be quite heavy. For instance, the weight of outdoor items, such as tree branches that are to be disposed, can be quite strenuous. However, heavy trash is also found with items that are disposed inside a residence or other location. In particular, trash accumulated in a kitchen can carry quite a heavy weight.

While a number of previous inventions have dealt with other issues related to the weight of trash in the hazardous waste industry (U.S. Pat. No. 5,641,947) and other industrial settings (U.S. Pat. No. 5,235,325), prior art is lacking in addressing issues raised in this inventions, and especially within the home environment. Additionally, prior art is lacking in offering multiple options for alerting when the weight of refuse had reached a certain level. For instance, alerting via electronic and/or communication channels.

The object of the present invention then is to present a new system for alerting a user when the weight of the contents of a trash receptacle has reached or exceeded a weight limit that indicates to the user that it should be disposed.

Other objects and features of the invention and the manner in which the invention achieves its purpose will be appreciated from the foregoing and the following description and the accompanying drawings, which exemplify the invention.

SUMMARY OF THE INVENTION

The present invention provides a system for alerting users when the contents of a trashcan (i.e., refuse) have reached or exceeded a specified weight level. This invention is primarily for use within households. However, the present invention can be used in other situations where the purpose is to alert a party when refuse or some other container has reached or exceeded a specified weight.

In the preferred embodiment, the system will offer an alert to users when the weight of the contents of a container has reached or exceeded a specified level that is selected by the user or by someone associated with the user. The system measures the weight of the contents and will have the potential to send an alert in a plurality of ways when the weight in the trashcan has reached a specific level.

DETAILED DESCRIPTION OF THE PREFERRED EMBODIMENT

Explanation of Alert-Capable Refuse System

Figure 1:
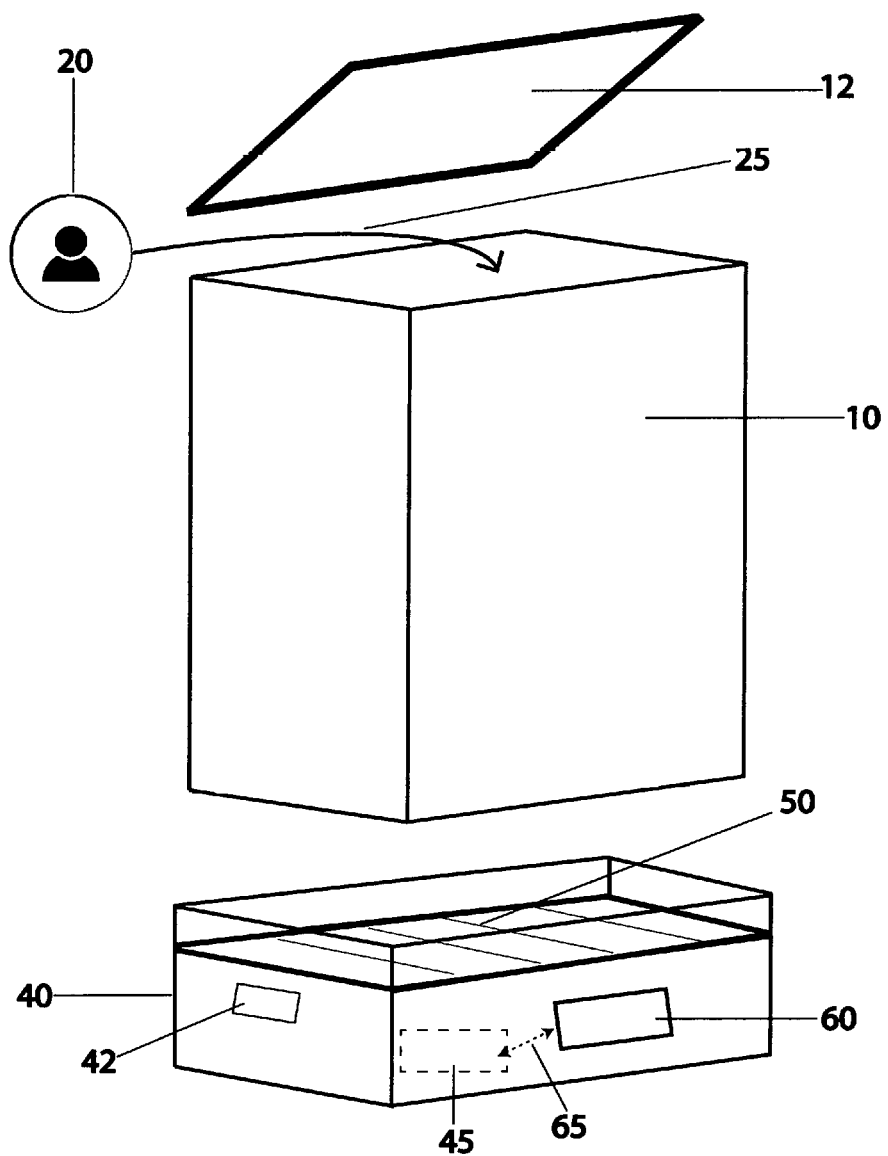
FIG. 1 shows the basic overview of the system.

In the drawings, wherein like reference numerals indicate like elements, there is illustrated in FIG. 1 the basic design of this invention. The preferred embodiment consists of a bin 10 into which a user 20 inserts 25 items. For this invention the user 20 may consist of the direct user who collects the refuse or an associate who handles aspects of this inventions such as programming certain settings.

In the preferred embodiment, it is intended as a container into which the user 20 inserts 25 refuse, such as trash, waste or other disposed items. The refuse may be inserted 25 directly into the bin 10 or the user 20 may elect to place refuse within a refuse bag that is then inserted 25 within the bin 10. The bin 10 may also be topped with a lid 12 that the user 20 would open or otherwise remove in order to insert 25 the refuse into the bin 10.

Furthermore, the bin 10 is placed on top of a bin holder 40. The bin 10 fits within the bin holder 40. The bin holder 40 includes an electronic or digital weight measurement scale 50 for measuring the weight of the contents within the bin 10. The electronic or digital weight measurement scale 50 is capable of measuring in U.S. customary units or in international metric units.

In the preferred embodiment, the bin holder 40 contains a programmable internal measurement and alert component 45 that may be capable of a plurality of processing activity including measuring or otherwise sensing the weight of contents contained in the bin 10 that are measured by the electronic or digital weight measurement scale 50, calculating date and time, and managing communication to alert when the refuse contained in the bin 10 has reached or exceeded a specified weight.

Control and settings associated with operation of the internal measurement and alert component 45 are handled through an interface device 60. As shown in FIG. 1, the internal measurement and alert component 45 is associated 65 with the interface device 60 with information exchanged between each. For instance, input into the interface device 60 will be communicated to the internal measurement and alert component 45 and information from the internal measurement and alert component 45 may be communicated to the interface device 60.

The functions of the interface device 60 include, but are not limited to:

1. Displaying the current weight of the contents in the bin 10.
2. Displaying the current date and time.
3. Enabling access to settings used to configure the internal measurement and alert component 45.

Figure 2:
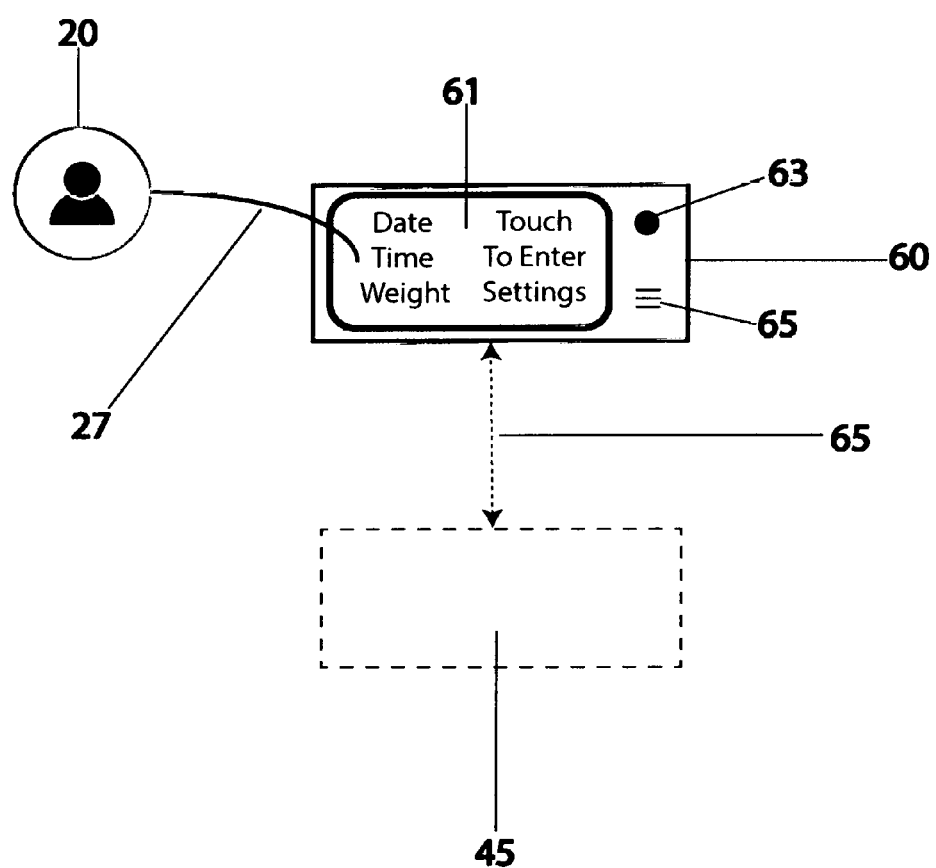
FIG. 2 shows the basic design and relationship of the internal measurement and alert component, and the interface device.

As presented in FIG. 2, in the preferred embodiment, the interface device 60 consists of a digital touch screen 61 entry option. Through the digital touch screen 61, a user 20 enters 27 settings including, but not limited to:

1. Setting the date and time
2. Setting the desired weight that triggers an alert(s)
3. Setting the type of alert(s)

Returning to FIG. 1, the interface device 60 may also contain a plurality of options for alerting when contents of the bin 10 have reached or exceeded a specified weight. As presented in FIG. 2, alerting options may include warning light(s) 63 and warning sound(s) 65. However, additional embodiments may enable the alert options including warning light(s) 62 and warning sound(s) 65 to be located separate from the interface device 60, such as a signaling light or a noise-producing device attached to the bin holder 40 (see FIG. 1) but not located within the interface device 60. Also, other embodiments may enable the warning light(s) 63 to be displayed within the digital touch screen 61. Additionally, alerts may be in the form of a warning message appearing on the digital touch screen 61.

Returning for FIG. 1, in the preferred embodiment, the power for the electronic or digital weight measurement scale 50, internal measurement and alert component 45, interface device 60 and other potential electronic elements of this invention are battery powered with a battery compartment 42 located on the outside of the bin holder 40 or, in another embodiment, access to the battery compartment 42 is located on the underside of the bin holder 40.

OTHER EMBODIMENTS

It will be appreciated by those skilled in the art that the foregoing has set forth the presently preferred embodiment of the invention and an illustrative embodiment of the invention, but that numerous alternative embodiments are possible without departing from the novel teachings of the invention. For example, referring to FIG. 2, in another embodiment of the invention, the internal measurement and alert component 45 may contain the ability to communicate alerts through electronic and/or communication channel(s), including over the Internet and through wireless and mobile communication channels.

Also, referring to FIG. 2, the power for the electronic or digital weight measurement scale 50, internal measurement and alert component 45, interface device 60 and other potential electronic elements of this invention may be through electrical hookup, such as through a cord connected to an electrical outlet.

Also, referring to FIG. 2, settings for the internal measurement and alert component 45 may be handled through an interface device 60 that is not a digital touch screen 61. For instance, settings can be entered using a push button interface.

Also, referring to FIG. 1, the contents placed into the bin 10 may include other items not classified as refuse but which will benefit from a means for alerting when the weight of such contents contained in the bin 10 has reached or exceeded a specified weight.

Also, referring to FIG. 1, another embodiment of this invention may not include the bin 10 (or an associated lid 12), thus allowing the user 20 to insert their own compatible-sized container onto bin holder 40.

Also, referring to FIG. 2, another embodiment of this invention may allow for alerts to be presented based on date or timing, and not just weight. For instance, a user may identify that refuse must be removed on certain day(s). Such information could be entered into the internal measurement and alert component 45 through an interface device 60. When that date or time is reached an alert will be presented.

Conclusion, Ramification and Scope

The present invention provides a system for alerting users when the weight in a refuse container has reached or exceeded a specified level. Such a system is especially directed to households where injury from lifting heavy objects can present health problems. Currently, prior art does not address this within the household market. Additionally, prior art has not presented more advanced options for alerting users when the weight in a refuse container has reached or exceeded a specified level.

The current invention addresses the issues of measuring the weight of household refuse and alert methods. Thus, advantages of this invention include, but are not limited to, application to the consumer market and offering a variety of methods for alerting the user. In addition, conceivably the end-user may benefit from reducing health risks associate with lifting heavy items.

We claim:

1. A system intended for providing alerts associated with the weight of collected refuse including trash, garbage or other waste comprising:
 a container into which refuse is deposited;
 an electronic or digital weight measurement scale to which said container is placed, attached or otherwise connected in order to accurately determine the weight of the refuse in said container;
 an internal measurement and alert component for processing and communicating information related to said electronic or digital weight measurement scale;
 an interface device associated with said internal measurement and alert component in order to program or otherwise enter user information or display information associated with operation of the said system including weight thresholds and dates and times of refuse removal;
 an alert output component associated with said internal measurement and alert component in order to emit a warning(s) only if the weight of said container equals or exceeds a desired or preset level set by the user, on a set date and time for which a refuse removal is scheduled.

2. The system in claim 1, wherein the said electronic or digital weight measurement scale measures the weight of items placed in the container.

3. The system in claim 1, wherein the said internal measurement and alert component includes user programmable electronic or digital components.

4. The system in claim 3, wherein said interface device associated with said internal measurement and alert component includes electronic or digital means for entering user settings and information associated with the operation of the said internal measurement and alert component.

5. The system in claim 1, wherein said interface device associated with said internal measurement and alert component includes electronic or digital means for displaying information associated with the operation of the said internal measurement and alert component.

6. The system in claim 1, wherein said measurement and alert component is user programmable through said interface device to produce audio warning(s) through said alert output component when weight in said container equals or exceeds desired or preset level set by user, on set date and time for which refuse removal is scheduled.

7. The system in claim 1, wherein said measurement and alert component is user programmable through said interface device to cease audio warning(s) through said alert output component when weight in container no longer exceeds desired or preset level set by user.

8. The system in claim 6, wherein the said measurement and alert component producing audio warning(s) is user programmable through said interface device to produce different audio warning sounds through said alert output component when weight in container exceeds desired or preset level set by user, on set date and time for which refuse removal is scheduled.

9. The system in claim 6, wherein the said audio warnings include voice, music and warning sounds.

10. The system in claim 6, wherein the said audio warnings are presented through said alert output component, including audio speaker(s).

11. The system in claim 1, wherein said measurement and alert component is user programmable through said interface device to produce visual warning(s) through said alert output component when weight in said container equals or exceeds desired or preset level set by user, on set date and time for which refuse removal is scheduled.

12. The system in claim 1, wherein said measurement and alert component is user programmable through said interface device to cease visual warning(s) through said alert output component when weight in container no longer exceeds desired or preset level set by user.

13. The system in claim 11, wherein the said measurement and alert component producing visual warnings is user programmable through said interface device to produce different visual warnings through said alert output component when weight in container exceeds desired or preset level set by user, on set date and time for which refuse removal is scheduled.

14. The system in claim 11, wherein the said visual warnings are presented through said alert output component, including lights and communication messages.

15. The system in claim 14, wherein the said communication messages are presented on said interface device.

16. The system in claim 14, wherein the said communication messages are presented through electronic and/or communication channel(s), including over the Internet and through wireless and mobile communication channels.

17. The system of claim 1, wherein the container is a standard kitchen-sized container intended for collecting trash, garbage or other waste.

18. The system in claim 17, wherein the capacity of said container varies depending on the size of the container.

* * * * *